(12) United States Patent
Chakravarty et al.

(10) Patent No.: US 11,902,177 B1
(45) Date of Patent: Feb. 13, 2024

(54) SYSTEM FOR ARTIFICIAL INTELLIGENCE-BASED ENGINE FOR GENERATING RECOMMENDATIONS FOR RESOURCE ALLOCATION

(71) Applicant: BANK OF AMERICA CORPORATION, Charlotte, NC (US)

(72) Inventors: Srinath S. Chakravarty, Plano, TX (US); Steven Nathan Greene, Scarsdale, NY (US); Aravind Shankaragouda Singtalur, McKinney, TX (US); Dinesh Kumar Agrawal, Rowlett, TX (US); Kenneth L. Boyd, Mechanicsville, VA (US); Kerry M. Vaughan, Lawrenceville, NJ (US); Stephen Richard Belton, Garden City, NY (US); Petar Evan Puskarich, Murphy, TX (US)

(73) Assignee: BANK OF AMERICA CORPORATION, Charlotte, NC (US)

(*) Notice: Subject to any disclaimer, the term of this patent is extended or adjusted under 35 U.S.C. 154(b) by 0 days.

(21) Appl. No.: 17/966,555

(22) Filed: Oct. 14, 2022

(51) Int. Cl.
*H04L 47/765* (2022.01)
*H04L 41/16* (2022.01)

(52) U.S. Cl.
CPC ............ *H04L 47/765* (2013.01); *H04L 41/16* (2013.01)

(58) Field of Classification Search
CPC ............................. H04L 47/765; H04L 41/16
USPC .......................................................... 709/226
See application file for complete search history.

(56) References Cited

U.S. PATENT DOCUMENTS

| | | | |
|---|---|---|---|
| 6,876,668 B1 * | 4/2005 | Chawla | H04L 49/90 370/468 |
| 9,489,630 B2 | 11/2016 | Achin | |
| 10,142,204 B2 | 11/2018 | Nickolov | |
| 10,521,778 B2 | 12/2019 | Bull | |
| 10,558,924 B2 | 2/2020 | Achin | |
| 10,585,773 B2 | 3/2020 | Tiwari | |
| 10,620,923 B2 | 4/2020 | Allan | |
| 10,621,004 B2 | 4/2020 | Gulsvig Wood | |
| 10,770,181 B2 | 9/2020 | Bull | |
| 10,983,895 B2 | 4/2021 | Babu | |
| 11,030,484 B2 | 6/2021 | Walters | |
| 11,080,718 B2 | 8/2021 | Wiig | |
| 11,086,688 B2 | 8/2021 | Bishop | |
| 11,119,980 B2 | 9/2021 | Szczepanik | |
| 11,170,445 B2 | 11/2021 | Irwin | |
| 11,238,377 B2 | 2/2022 | Polleri | |

(Continued)

*Primary Examiner* — Adnan M Mirza
(74) *Attorney, Agent, or Firm* — Moore & Van Allen PLLC; Seongun M. Hong (57) ABSTRACT

A system is provided for an artificial intelligence-based engine for generating recommendations for resource allocation. In particular, the system may comprise an artificial intelligence module configured to access one or more data sources containing resource data associated with one or more users. Based on the resource data, the system may identify a group of analogous users with respect to a specific user. The system may then generate one or more recommendations for a resource allocation associated with the user. The one or more recommendations may then be presented on a graphical interface of a user device associated with the user. In this way, the system may provide an AI-driven method for efficient allocation of resources.

14 Claims, 4 Drawing Sheets

(56) References Cited

U.S. PATENT DOCUMENTS

| | | |
|---|---|---|
| 11,392,962 B2 | 7/2022 | Rodkey |
| 2020/0090075 A1 | 3/2020 | Achin |
| 2020/0160458 A1 | 5/2020 | Bodin |
| 2020/0195495 A1 | 6/2020 | Parker |
| 2021/0081837 A1 | 3/2021 | Polleri |
| 2022/0004926 A1 | 1/2022 | Cella |
| 2022/0058658 A1* | 2/2022 | Herrera ................. G06F 16/215 |
| 2022/0207073 A1* | 6/2022 | Sohail ..................... G10L 15/22 |
| 2023/0177085 A1* | 6/2023 | Sriharsha ............ G06F 16/2379 |
| | | 706/12 |

\* cited by examiner

SYSTEM FOR ARTIFICIAL INTELLIGENCE-BASED ENGINE FOR GENERATING RECOMMENDATIONS FOR RESOURCE ALLOCATION

FIELD OF THE INVENTION

The present invention embraces a system for an artificial intelligence-based engine for generating recommendations for resource allocation.

BACKGROUND

There is a need for an efficient way to perform resource allocations.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

A system is provided for an artificial intelligence-based engine for generating recommendations for resource allocation. In particular, the system may comprise an artificial intelligence module configured to access one or more data sources containing resource data associated with one or more users. Based on the resource data, the system may identify a group of analogous users with respect to a specific user. The system may then generate one or more recommendations for a resource allocation associated with the user. The one or more recommendations may then be presented on a graphical interface of a user device associated with the user. In this way, the system may provide an AI-driven method for efficient allocation of resources.

Accordingly, embodiments of the present disclosure provide a system for an artificial intelligence-based engine for generating recommendations for resource allocation, the system comprising at least one non-transitory storage device; and at least one processor coupled to the at least one non-transitory storage device, wherein the at least one processor is configured to receive, from an endpoint device, a query to identify an optimal resource allocation associated with a target user; access an aggregated data store, wherein the aggregated data store comprises characteristic data associated with one or more users; based on the characteristic data, compute one or more match scores associated with the target user; based on the one or more match scores, identify one or more analogous users associated with the target user; based on the match scores and the one or more analogous users, compute the optimal resource allocation; and present the optimal resource allocation on a graphical user interface of the endpoint device.

In some embodiments, the characteristic data comprises at least one of historical resource allocation data, resource allocation pattern data, and resource allocation projection data.

In some embodiments, each of the one or more match scores is a composite score comprising at least one of a historical resource score and a resource allocation pattern score.

In some embodiments, identifying the one or more analogous users comprises setting a match score threshold; and filtering the one or more match scores to identify match scores within the one or more match scores that meet or exceed the match score threshold.

In some embodiments, the endpoint device is a user computing device of the target user.

In some embodiments, the endpoint device is a user computing device of a third-party user associated with the target user.

In some embodiments, the query further comprises a request to identify one or more analogous resource allocation patterns associated with the one or more analogous users.

Embodiments of the present disclosure also provide a computer program product for an artificial intelligence-based engine for generating recommendations for resource allocation, the computer program product comprising a non-transitory computer-readable medium comprising code causing an apparatus to receive, from an endpoint device, a query to identify an optimal resource allocation associated with a target user; access an aggregated data store, wherein the aggregated data store comprises characteristic data associated with one or more users; based on the characteristic data, compute one or more match scores associated with the target user; based on the one or more match scores, identify one or more analogous users associated with the target user; based on the match scores and the one or more analogous users, compute the optimal resource allocation; and present the optimal resource allocation on a graphical user interface of the endpoint device.

In some embodiments, the characteristic data comprises at least one of historical resource allocation data, resource allocation pattern data, and resource allocation projection data.

In some embodiments, each of the one or more match scores is a composite score comprising at least one of a historical resource score and a resource allocation pattern score.

In some embodiments, identifying the one or more analogous users comprises setting a match score threshold; and filtering the one or more match scores to identify match scores within the one or more match scores that meet or exceed the match score threshold.

In some embodiments, the endpoint device is a user computing device of the target user.

In some embodiments, the query further comprises a request to identify one or more analogous resource allocation patterns associated with the one or more analogous users.

Embodiments of the present disclosure also provide a computer-implemented method for an artificial intelligence-based engine for generating recommendations for resource allocation, the computer-implemented method comprising receiving, from an endpoint device, a query to identify an optimal resource allocation associated with a target user; accessing an aggregated data store, wherein the aggregated data store comprises characteristic data associated with one or more users; based on the characteristic data, computing one or more match scores associated with the target user; based on the one or more match scores, identifying one or more analogous users associated with the target user; based on the match scores and the one or more analogous users, computing the optimal resource allocation; and presenting the optimal resource allocation on a graphical user interface of the endpoint device.

In some embodiments, the characteristic data comprises at least one of historical resource allocation data, resource allocation pattern data, and resource allocation projection data.

In some embodiments, each of the one or more match scores is a composite score comprising at least one of a historical resource score and a resource allocation pattern score.

In some embodiments, identifying the one or more analogous users comprises setting a match score threshold; and filtering the one or more match scores to identify match scores within the one or more match scores that meet or exceed the match score threshold.

In some embodiments, the endpoint device is a user computing device of the target user.

In some embodiments, the endpoint device is a user computing device of a third-party user associated with the target user.

In some embodiments, the query further comprises a request to identify one or more analogous resource allocation patterns associated with the one or more analogous users.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface ("GUI") or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, "resource" may generally refer to physical or virtual objects that may be used to accomplish the entity's objectives. In this regard, the resources may include computing resources such as processing power, memory allocation, cache space, storage space, data files, network connections and/or bandwidth, electrical power, input/output functions, and the like, or data files (e.g., document files, media files, system files, and/or the like). In other embodiments, resources may refer to financial resources such as funds or digital currencies, where such resources may be linked to an account associated with a user.

Embodiments of the present disclosure provide a system for artificial intelligence-based engine for generating recommendations for resource allocation. In this regard, users may be provided with authenticated access to a graphical user interface of a resource allocation platform presented by the system on a user computing device associated with the user (e.g., a smartphone or personal computer owned by the user). The resource allocation platform may be configured to present to the user a snapshot of resource allocations of other users within the system, where the other users are selected based on one or more shared characteristics with the user. Accordingly, the other users may be referred to herein as "analogous users."

To this end, the system may generate an aggregated data store comprising aggregated characteristic data associated with the one or more users authorized to access the resource allocation platform. The aggregated characteristic data may contain, for instance, biographical data, historical resource allocations (e.g., the saving, expenditure, and/or investment of funds), resource allocation patterns, amount of resources within the user's resource account, and/or the like. The system may receive a query with respect to a target user to identify an optimal resource allocation and/or identify one or more analogous users with respect to the target user. In some embodiments, the query may be submitted by the target user logging onto the resource allocation platform. In other embodiments, the query may be submitted by a user who may be an employee of an entity (e.g., a financial institution) with whom the target user has an established relationship (e.g., a service provider and customer).

Based on receiving the query associated with the target user, the system may use the characteristic data to compute "match scores" for each user within the aggregated data store with respect to the target user. In this regard, each match score may indicate the degree of likeness or analogousness of a particular user to the target user. In some embodiments, the match score may be a composite score which may be calculated based on one or more sub-scores, where each sub-score is calculated based on a degree of likeness or similarity with respect to a particular characteristic (e.g., similar resource allocation patterns).

Once the system has computed the match scores for each user within the aggregated data store, the system may filter the users based on a threshold match score (e.g., 70%) to identify one or more analogous users, where the match scores for the one or more analogous users meet or exceed the set threshold match score. In some embodiments, the threshold match score may be set (e.g., by the target user) as part of the initial query to the system.

Based on identifying the one or more analogous users, the system may present, on the graphical user interface, one or more recommendations based on the one or more analogous users and/or the characteristic data associated with said analogous users. For instance, the one or more recommendations may comprise an optimal resource allocation for the target user based on the characteristic data of the one or more analogous users (e.g., a resource allocation breakdown of optimal saving, investment, and/or spending), recommendations to acquire certain resources (e.g., specific stocks or vehicles), historical resource allocation patterns associated with the target user and/or the one or more analogous users, and/or the like. Accordingly, the one or more recommendations may be presented in a number of different forms, which may include text, graphs, charts, audio and/or video data, and/or the like. In some embodiments, the system may further be configured to present historical return data associated with the one or more analogous users on the graphical user interface.

In some embodiments, the system may set a minimum threshold for the number of analogous users that are identified by the system in response to a query associated with the target user. If the number of analogous users identified by the system in response to a particular query falls below the minimum threshold, the system may determine that the one or more recommendations are based on a low sample size. In such embodiments, the system may present a notification on the graphical user interface, where the notification comprises an indication that the one or more recommendations have been generated based on a low sample size.

An exemplary embodiment is provided as follows. It should be understood that the following example is provided for illustrative purposes only and is not intended to restrict or limit the scope of the disclosure herein. In an exemplary embodiment, a user may wish to know how similarly situated users have allocated their resources (e.g., which resources were selected for investment, how much resources were put into savings, and/or the like). To this end, the user (who may be the target user) may log onto the resource allocation platform by providing authentication credentials associated with the user (e.g., a username and password, PIN, biometric data, and/or the like).

Upon accessing the resource allocation platform, the user may submit a query to the system to compute an optimal resource allocation with respect to the target user. On receiving the query, the system may access the aggregated data store and analyze the characteristic data therein (e.g., using a data analytics engine) with respect to one or more users. The system may compute match scores for each of the one or more users, where the match score indicates the similarity between the one or more users and the target user based on shared characteristics. Once the match scores have been computed, the system may present to the user information regarding how various other analogous users (who may be similarly situated to the target user) have allocated their resources, as well as one or more recommendations on how the target user should allocate the resources based on the behaviors and/or patterns of the analogous users (e.g., the system may recommend that the target user increases the percentage of resources allocated into investments). In this way, the recommendations output by the system may increase the confidence of the target user in the resource allocation actions and/or behaviors of the target user.

The system as described herein provides a number of technological benefits over conventional resource allocation systems. In particular, by using an artificial intelligence module to compute match scores within the aggregated data score, the system may provide a response to the user's query (e.g., an optimized resource allocation scheme) in an efficient and accurate manner.

Figure 1A:
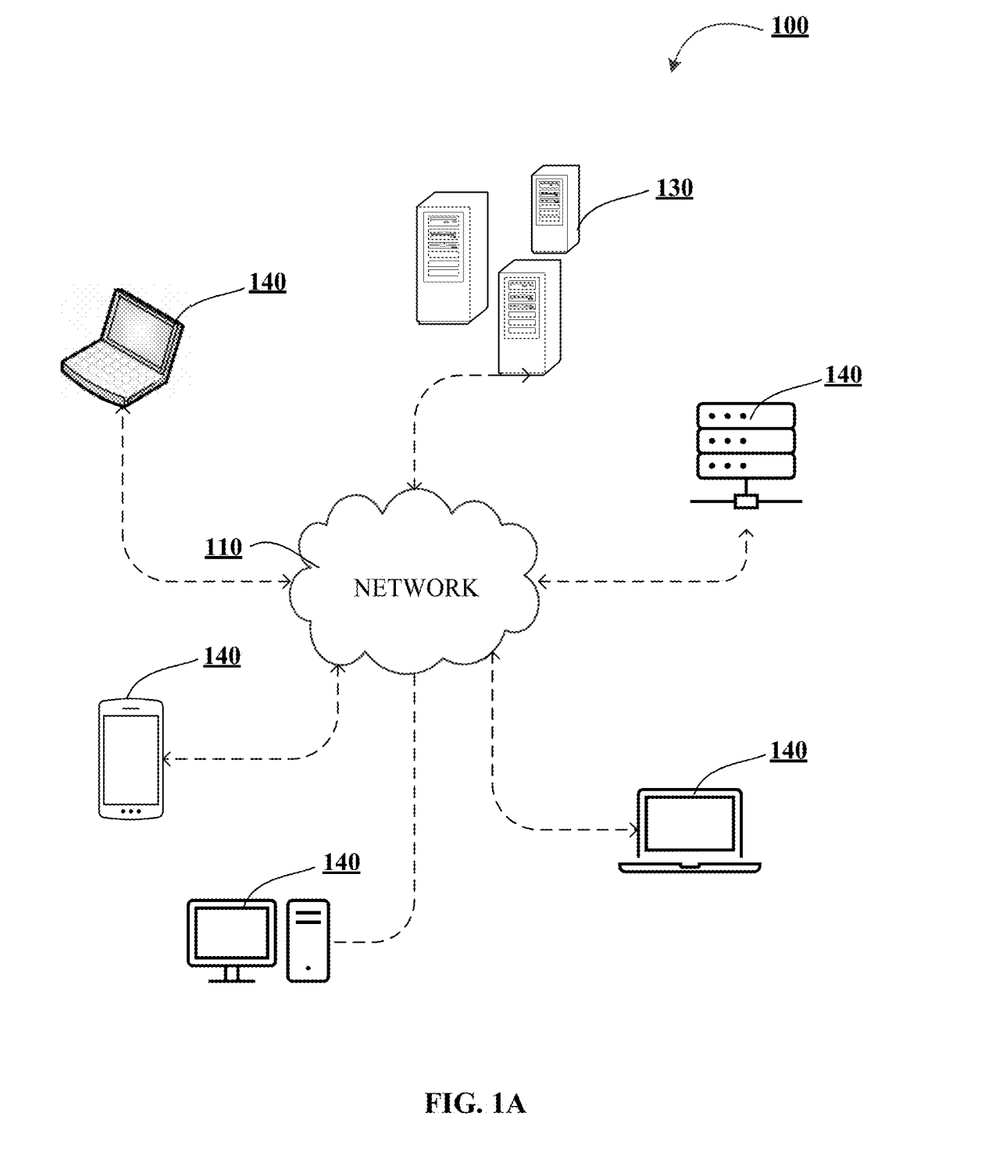
FIGS. 1A-1C illustrates technical components of an exemplary distributed computing environment for the system for an artificial intelligence-based engine for generating recommendations for resource allocation, in accordance with an embodiment of the present disclosure.
Figure 1B:
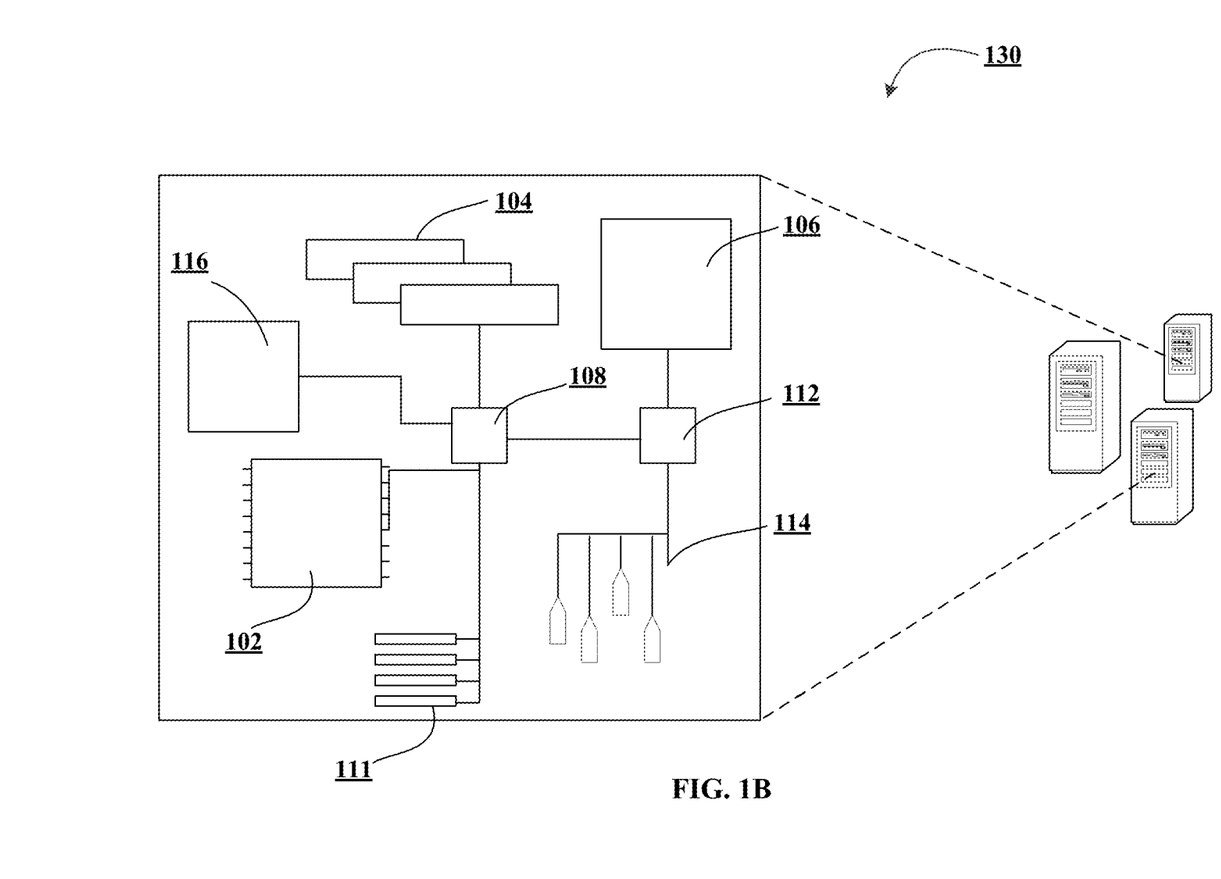
Figure 1C:
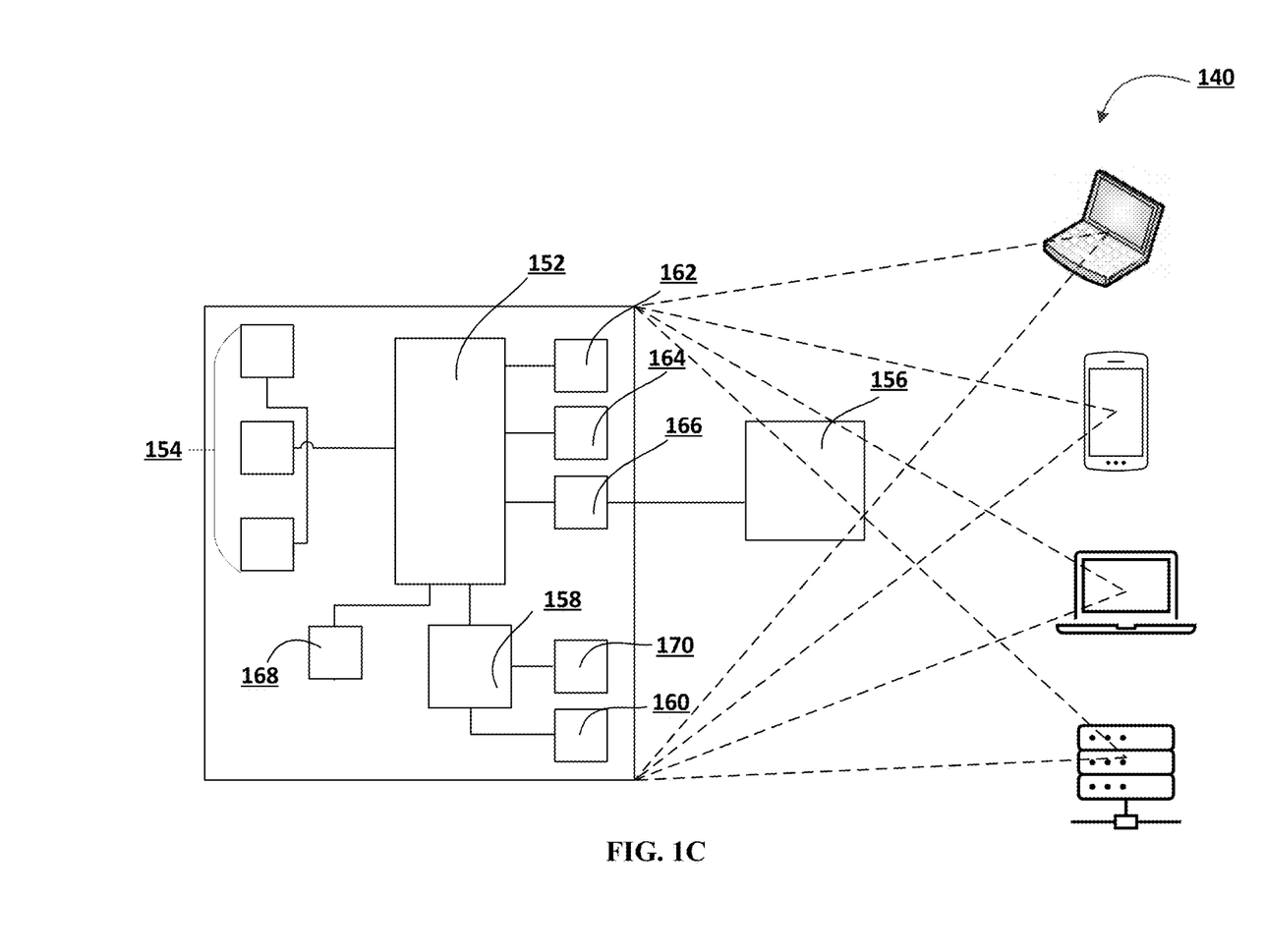

FIGS. 1A-1C illustrate technical components of an exemplary distributed computing environment 100 for the system for artificial intelligence-based engine for generating recommendations for resource allocation. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it. In some embodiments, the system 130 may provide an application programming interface ("API") layer for communicating with the end-point device(s) 140.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as servers, networked storage drives, personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer-or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

Figure 2:
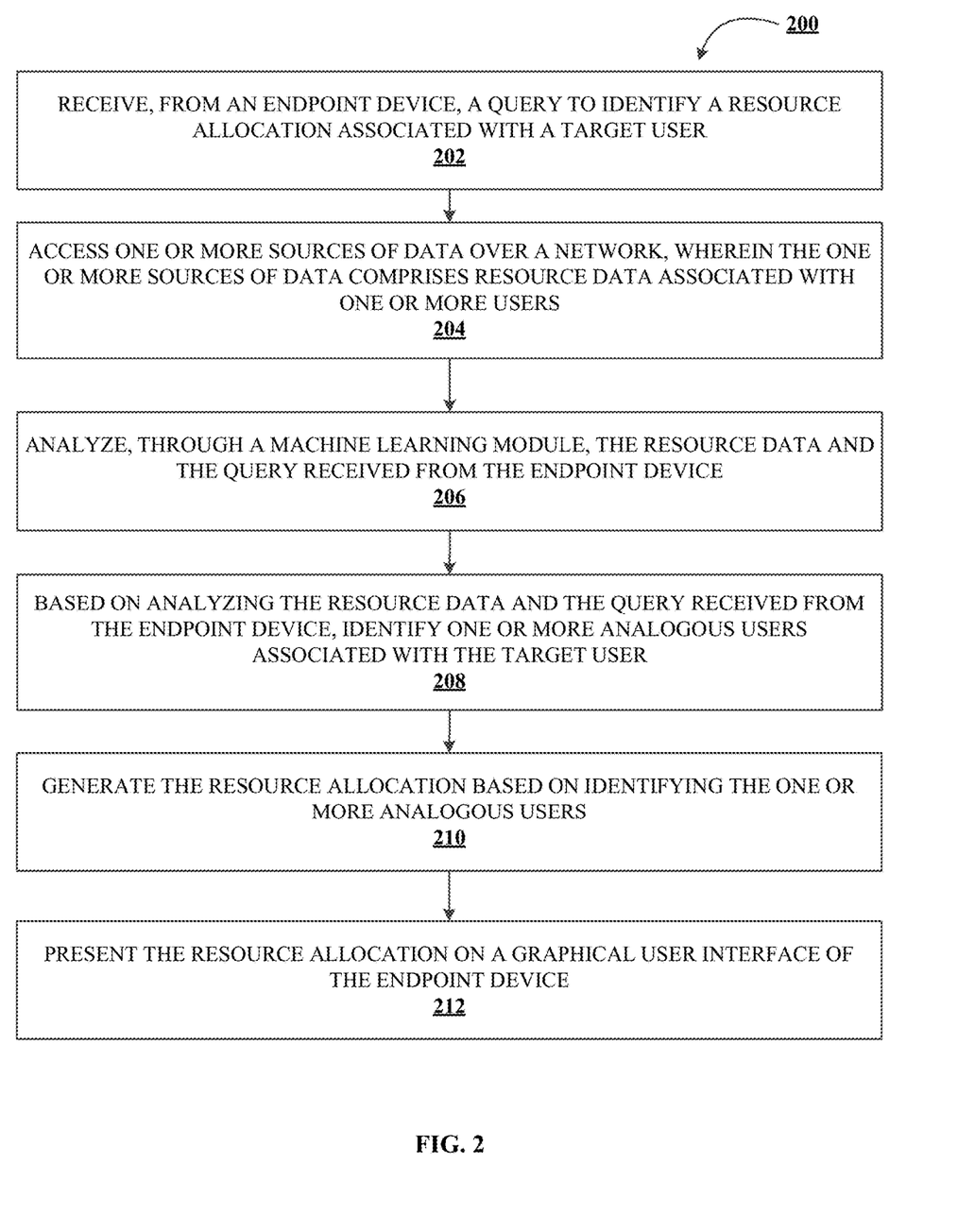
FIG. 2 illustrates a process flow for an artificial intelligence-based engine for generating recommendations for resource allocation, in accordance with an embodiment of the present disclosure.

FIG. 2 illustrates a process flow 200 for an artificial intelligence-based engine for generating recommendations for resource allocation, in accordance with an embodiment of the present disclosure. The process begins at block 202, where the system receives, from an endpoint device, a query to identify a resource allocation associated with a target user. The query may be received through the resource allocation portal, where a graphical interface of the resource allocation portal may be displayed on the endpoint device. For instance, a user of the endpoint device may select the corresponding UI element within the graphical interface that causes the query to be submitted to the system. Accordingly, in some embodiments, the resource allocation portal may be accessible through an entity-provided application installed on the endpoint device. In other embodiments, the resource allocation portal may be hosted as a web site or service accessible through a third party application installed on the endpoint device (e.g., a web browser).

The query to identify the resource allocation may be a request for a recommendation as to the most efficient manner in which the user may allocate the user's resources (e.g., resources within a user resource account). For instance, the user may wish to know the most resource efficient breakdown of conserving, investing, and spending of resources within the user's resource account. Accordingly, the system may use an artificial intelligence driven process to compute the requested resource allocation based on the data aggregated by the system, as described in further detail elsewhere herein. In some embodiments, the user may wish to know how other users who are similarly situated have allocated their resources. In such embodiments, the query may further comprise a request to identify one or more analogous resource allocation patterns of one or more analogous users with respect to the target user.

The endpoint device may be, for instance, a user computing device operated by a user to access the resource allocation platform hosted by the system. Accordingly, in some embodiments, the user may be the target user who wishes to see a recommended optimal resource allocation for the target user. In other embodiments, the user may be an employee or agent of the entity (e.g., a third-party user) who may be accessing the resource allocation platform on behalf of the target user (e.g., a customer of the entity). In some embodiments, the system may require that users authenticate themselves before submitting the query. In such embodiments, the system may prompt the endpoint device to provide authentication credentials associated with the user and/or the target user (e.g., a username and password associated with the user and/or the target user). Upon receiving the credentials from the endpoint device, the system may authenticate the endpoint device and allow the endpoint device to access the resource allocation portal.

The process continues to block 204, where the system accesses one or more sources of data over a network, wherein the one or more sources of data comprises resource data associated with one or more users. The system may aggregate data from various sources regarding the various users tracked by the system along with the resources associated with such users. Accordingly, the resource allocation data may comprise resource allocation data, where the resource allocation data may comprise various types of information regarding how resources were allocated by the various users tracked by the system. In this regard, the resource data may include historical resource data (e.g., how resources were allocated in the past by the various users, historical returns realized by the users, and/or the like), resource allocation pattern data, resource allocation projection data, and/or the like. In some embodiments, the characteristic data may further comprise other types of information, such as biographical information, web browsing patterns, product and/or service preferences, and/or the like.

The process continues to block 206, where the system analyzes, through a machine learning module, the resource data and the query received from the endpoint device. In some embodiments, analyzing the resource data and the query may comprise computing a match score for each of the users, where the match scores may indicate the degree of similarity or analogousness of certain characteristics, behaviors, resource allocations, or the like between the users within the aggregated data store and the target user. Accordingly, higher match scores may indicate a higher degree of similarity, whereas lower match scores may indicate a lower degree of similarity. In computing the match scores, the system may compare the characteristic data of the one or more users within the aggregated data score with the characteristic data associated with the target user. The degree of similarity in characteristic data may be computed using an artificial intelligence module which may be trained (e.g., through machine learning) to assess the characteristic data. In some embodiments, each match score may be a composite score that may comprise a score for each type of characteristic that has been assessed by reading the characteristic data. For example, a match score may comprise a historical resource score, a resource allocation pattern score, and/or the like.

In some embodiments, analyzing the resource data may further comprise analyzing historical return data associated with the one or more users. Based on analyzing the historical return data, the system may incorporate the analysis of the historical return data into the recommendations provided on the graphical interface. For instance, the recommendation may indicate the amount of return realized by certain users based on a specific resource allocation.

The process continues to block 208, where the system, based on analyzing the resource data and the query received from the endpoint device, identify one or more analogous users associated with the target user. In this regard, the system may analyze the resource data to identify users who share certain characteristics with the target user. Accordingly, in some embodiments, the system may set a match score threshold for the one or more analogous users, where the match score threshold represents a minimum match score that must be met for the system to consider a user within the aggregated data store as an "analogous user" to the target user. Accordingly, the system may filter the match scores computed in the previous step according to the match score threshold and identify the "one or more analogous users" as the users associated with the match scores that meet or exceed the match score threshold.

The process continues to block 210, where the system generates the resource allocation based on identifying the one or more analogous users. In some embodiments, the resource allocation may be determined according to the criteria specified within the initial query. For instance, the optimal resource allocation may be the allocation of resources that results in the greatest resource efficiency (e.g., the highest return on resource investment). In other embodiments, the optimal resource allocation may be an allocation of resources that is computed based on an average resource allocation of the one or more analogous users (e.g., a resource allocation that is most similar to those of the one or more analogous users). Accordingly, the optimal resource allocation may indicate the most optimal uses of resources in various categories (e.g., investing, saving, spending, and/or the like).

An illustrative embodiment is described as follows for generating resource allocations. The system may identify a static data set of users from the one or more data sources, where the data set may comprise a plurality of user portraits (e.g., data about one million users), where each user portrait may be associated with a specific resource allocation pattern or breakdown. From the data set, the system may be configured to identify the peaks within the data set with respect to certain resource allocations. For instance, a first resource allocation (e.g., 10% saving, 40% spending, and 50% investing) may return 10000 user portraits, whereas a second resource allocation (e.g., 30% saving, 30% spending, and 40% investing) may return 8000 user portraits. Accordingly, the system may identify matches between the user and the other users covered by the system, as described above, and based on the characteristics of the user, identify the peaks in the data set corresponding to the characteristics of the target user (e.g., identify the most common resource allocation pattern among users who are most similar to the target user). The system may present both the current resource allocation pattern of the target user and the peaks within the data set on the graphical user interface. In this way, a user may be able to visualize and compare the user's resource allocation pattern with the resource allocation patterns of the analogous users.

The process continues to block 212, where the system presents the resource allocation on a graphical user interface of the endpoint device. The resource allocation, along with other types of information, may be presented using various elements, such as text fields, charts, graphs, tables, and/or the like. For instance, the system may display the resource allocations of the analogous users (e.g., how the analogous users have saved, invested, and/or spent their resources). In some embodiments, the resource allocations may be presented as percentage values. For example, the system may display the percentage of resources spent, saved, and/or invested in an optimal allocation pattern and/or resource allocation patterns of the analogous users. By accessing the statistical data of the one or more analogous users, the target user may gain a level of confidence in the resource posture of the target user with respect to resource allocation. In some embodiments, the system may display one or more recommendations in addition to the optimal resource allocation, where the one or more recommendations comprises a recommendation with respect to a holistic resource portrait associated with the user. For instance, the one or more recommendations may comprise a recommendation to invest in a specific resource to improve the resource stance of the target user.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for an artificial intelligence-based engine for generating recommendations for resource allocation, the system comprising:
    at least one non-transitory storage device; and
    at least one processor coupled to the at least one non-transitory storage device, wherein the at least one processor is configured to:
    receive, from an endpoint device, a query to identify a resource allocation associated with a target user, wherein the endpoint device is a user computing device of a third-party user associated with the target user;
    access one or more sources of data over a network, wherein the one or more sources of data comprises resource data associated with one or more users;
    compute a match score for each of the one or more users, wherein the match score indicates a degree of analogousness of each of the one or more users to the target user, wherein the match score comprises one or more sub-scores, wherein each of the one or more sub-scores indicates a degree of analogousness between each of the one or more users and the target user with respect to a characteristic;

analyze, through a machine learning module, the resource data and the query received from the endpoint device;

based on analyzing the resource data and the query received from the endpoint device, identify one or more analogous users associated with the target user, wherein identifying the one or more analogous users comprises filtering the one or more users based on a threshold match score;

generate the resource allocation based on identifying the one or more analogous users; and present the resource allocation on a graphical user interface of the endpoint device.

2. The system of claim 1, wherein the resource data comprises at least one of historical resource allocation data, resource allocation pattern data, and resource allocation projection data, wherein presenting the resource allocation comprises displaying historical return data associated with the one or more analogous users.

3. The system of claim 2, wherein analyzing the resource data comprises analyzing the historical return data associated with the one or more analogous users.

4. The system of claim 1, wherein the query further comprises a request to identify one or more analogous resource allocation patterns associated with the one or more analogous users.

5. The system of claim 1, wherein accessing the one or more sources of data comprises providing an application programming interface ("API") for communicating with one or more computing systems within the network.

6. A computer program product for an artificial intelligence-based engine for generating recommendations for resource allocation, the computer program product comprising a non-transitory computer-readable medium comprising code causing an apparatus to:

receiving, from an endpoint device, a query to identify a resource allocation associated with a target user, wherein the endpoint device is a user computing device of a third-party user associated with the target user;

accessing one or more sources of data over a network, wherein the one or more sources of data comprises resource data associated with one or more users;

computing a match score for each of the one or more users, wherein the match score indicates a degree of analogousness of each of the one or more users to the target user, wherein the match score comprises one or more sub-scores, wherein each of the one or more sub-scores indicates a degree of analogousness between each of the one or more users and the target user with respect to a characteristic;

analyzing, through a machine learning module, the resource data and the query received from the endpoint device;

based on analyzing the resource data and the query received from the endpoint device, identifying one or more analogous users associated with the target user, wherein identifying the one or more analogous users comprises filtering the one or more users based on a threshold match score;

generating the resource allocation based on identifying the one or more analogous users; and presenting the resource allocation on a graphical user interface of the endpoint device.

7. The computer program product of claim 6, wherein the resource data comprises at least one of historical resource allocation data, resource allocation pattern data, and resource allocation projection data, wherein presenting the resource allocation comprises displaying historical return data associated with the one or more analogous users.

8. The computer program product of claim 7, wherein analyzing the resource data comprises analyzing the historical return data associated with the one or more analogous users.

9. The computer program product of claim 6, wherein accessing the one or more sources of data comprises providing an application programming interface ("API") for communicating with one or more computing systems within the network.

10. The computer program product of claim 6, wherein the query further comprises a request to identify one or more analogous resource allocation patterns associated with the one or more analogous users.

11. A computer-implemented method for an artificial intelligence-based engine for generating recommendations for resource allocation, the computer-implemented method comprising:

receiving, from an endpoint device, a query to identify a resource allocation associated with a target user, wherein the endpoint device is a user computing device of a third-party user associated with the target user;

accessing one or more sources of data over a network, wherein the one or more sources of data comprises resource data associated with one or more users;

computing a match score for each of the one or more users, wherein the match score indicates a degree of analogousness of each of the one or more users to the target user, wherein the match score comprises one or more sub-scores, wherein each of the one or more sub-scores indicates a degree of analogousness between each of the one or more users and the target user with respect to a characteristic;

analyzing, through a machine learning module, the resource data and the query received from the endpoint device;

based on analyzing the resource data and the query received from the endpoint device, identifying one or more analogous users associated with the target user, wherein identifying the one or more analogous users comprises filtering the one or more users based on a threshold match score;

generating the resource allocation based on identifying the one or more analogous users; and presenting the resource allocation on a graphical user interface of the endpoint device.

12. The computer-implemented method of claim 11, wherein the resource data comprises at least one of historical resource allocation data, resource allocation pattern data, and resource allocation projection data, wherein presenting the resource allocation comprises displaying historical return data associated with the one or more analogous users.

13. The computer-implemented method of claim 11, wherein accessing the one or more sources of data comprises providing an application programming interface ("API") for communicating with one or more computing systems within the network.

14. The computer-implemented method of claim 11, wherein the query further comprises a request to identify one or more analogous resource allocation patterns associated with the one or more analogous users.

* * * * *